United States Patent
Qiu et al.

(10) Patent No.: US 12,221,007 B2
(45) Date of Patent: Feb. 11, 2025

(54) UNLOCKING MECHANISM, SUPPORT ASSEMBLY, BATTERY PACK UNLOCKING METHOD, AND BATTERY PACK LOCKING METHOD

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Danliang Qiu, Shanghai (CN); Yingfu Zhou, Shanghai (CN); Meng Liu, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/014,481

(22) PCT Filed: Jul. 6, 2021

(86) PCT No.: PCT/CN2021/104808
§ 371 (c)(1),
(2) Date: Jul. 19, 2023

(87) PCT Pub. No.: WO2022/007806
PCT Pub. Date: Jan. 13, 2022

(65) Prior Publication Data
US 2024/0034187 A1    Feb. 1, 2024

(30) Foreign Application Priority Data
Jul. 6, 2020    (CN) .......................... 202010643312.X

(51) Int. Cl.
*B60L 53/80* (2019.01)
*E05B 81/30* (2014.01)
*E05B 81/40* (2014.01)
*E05B 83/00* (2014.01)

(52) U.S. Cl.
CPC .............. *B60L 53/80* (2019.02); *E05B 81/30* (2013.01); *E05B 81/40* (2013.01); *E05B 83/00* (2013.01)

(58) Field of Classification Search
CPC .......... B60L 53/80; B60L 50/66; E05B 81/30; E05B 81/40; E05B 83/00; Y02T 10/70; Y02T 10/7072; B60K 1/04
See application file for complete search history.

(56) References Cited

U.S. PATENT DOCUMENTS

| | | | | |
|---|---|---|---|---|
| 2014/0272510 A1* | 9/2014 | Mulato | ................... | B60L 53/80 429/99 |
| 2014/0300320 A1* | 10/2014 | Nakajima | .......... | H01R 13/6397 320/109 |
| 2015/0311487 A1* | 10/2015 | Choi | ...................... | B60L 53/80 429/98 |

FOREIGN PATENT DOCUMENTS

| | | |
|---|---|---|
| CN | 208376505 U | 1/2019 |
| CN | 110001596 A | 7/2019 |
| CN | 110626524 A | 12/2019 |
| CN | 212011049 U | 11/2020 |
| CN | 212685305 U | 3/2021 |
| CN | 212737725 U | 3/2021 |
| CN | 113161679 A | 7/2021 |
| CN | 113232499 A | 8/2021 |
| EP | 3663142 A1 | 6/2020 |
| JP | H11208287 A | 8/1999 |
| JP | 2019174474 A | 10/2019 |
| WO | 2019/024886 A1 | 2/2019 |

OTHER PUBLICATIONS

Sep. 30, 2021 International Search Report issued in International Patent Application No. PCT/CN2021/104808.
Sep. 30, 2021 Written Opinion of the International Searching Authority issued in International Patent Application No. PCT/CN2021/104808.
Aug. 17, 2022 International Preliminary Report on Patentability Chapter II issued in International Patent Application No. PCT/CN2021/104808.
Dec. 26, 2023 Notice of Reasons for Refusal issued in Japanese Patent Application No. 2023-500327.

* cited by examiner

*Primary Examiner* — Muhammad S Siddiquee

(57) ABSTRACT

The present invention discloses an unlocking mechanism, a support assembly, a battery pack unlocking method, and a battery pack locking method. The unlocking mechanism is used for unlocking a battery pack locked on a support of an electric vehicle. The unlocking mechanism comprises an unlocking input member and an unlocking output member; the unlocking input member is adapted to be connected to an external unlocking drive portion, and is driven by the external unlocking drive portion to drive the unlocking output member to move; the unlocking output member is adapted to be connected to a locking mechanism on the support and drive the locking mechanism to move to unlock or lock the battery pack. The unlocking input member is connected to the external unlocking driving portion to be driven to move, to drive the locking mechanism to move to achieve the purpose of unlocking or locking the battery pack.

15 Claims, 12 Drawing Sheets

UNLOCKING MECHANISM, SUPPORT ASSEMBLY, BATTERY PACK UNLOCKING METHOD, AND BATTERY PACK LOCKING METHOD

This application claims priority of Chinese patent application 202010643312X filed on Jul. 6, 2020. The contents of the above Chinese patent application are incorporated herein by reference in their entirety.

TECHNICAL FIELD

The present disclosure relates to an unlocking mechanism, a support assembly, a battery pack unlocking method, and a battery pack locking method.

BACKGROUND

In the prior art, the support is provided with a locking mechanism, and the battery pack is locked on the support by means of the locking mechanism. The unlocking mechanism is directly arranged on the outer casing of the battery pack, and the unlocking mechanism on the outer casing is pushed by an external force to realize the unlocking of the battery pack. Due to the frequent application of external force to the battery pack casing, the outer casing is easily deformed, which affects the service life of the battery pack casing. At the same time, for a battery pack with a larger size, the unlocking mechanism of this scheme is adopted. Since the locking mechanism is arranged on both sides of the battery pack, the transmission distance between the unlocking mechanism and the locking mechanism is relatively long, which affects the success rate of unlocking.

When the battery pack needs to be replaced, the external force should be input to the locking mechanism first to make the locking mechanism unlock the battery pack. After that, the battery pack is removed from the support by means of the battery swapping device. This unlocking process leads to a complicated process of removing the battery pack from the support, which is not conducive to improving the reliability of the vehicle in the process of battery swapping.

Content of the Present Invention

The technical problem to be solved in the present disclosure is to overcome the defect of poor reliability of vehicles in the prior art in the process of battery swapping, hence providing an unlocking mechanism, a support assembly, a battery pack unlocking method, and a battery pack locking method.

The present disclosure solves the technical problem by the following technical solutions:

An unlocking mechanism, which is used for unlocking a battery pack locked on a support of an electric vehicle. The unlocking mechanism comprises an unlocking input member and an unlocking output member, the unlocking input member is adapted to be connected to an external unlocking driving portion, and is driven by the external unlocking driving portion to drive the unlocking output member to move, the unlocking output member is adapted to be connected to a locking mechanism on the support and drive the locking mechanism to move to unlock or lock the battery pack.

The unlocking mechanism is driven to move by setting the unlocking input member to dock from the external unlocking driving portion, so as to transmit the movement to the locking mechanism by means of the unlocking output member and drive the locking mechanism to move to achieve the purpose of unlocking or locking the battery pack.

By means of the above-mentioned structural arrangement, a preferred implementation structure for driving the locking mechanism to unlock or lock relative to the battery pack is provided, so as to realize the purpose of automatic unlocking or locking, and improve the reliability of the unlocking or locking process in the process of battery swapping.

Preferably, the unlocking input member is located on the lower surface of a bottom plate of the support, so as to facilitate docking with the external unlocking driving portion.

Preferably, the unlocking input member is provided with a limiting member for limiting a horizontal movement of the unlocking input member relative to the support along a Y direction, so that the unlocking input member can move within a reasonable displacement range driven by the unlocking driving portion by means of limiting the displacement of the horizontal movement of the unlocking input member along the Y direction.

Preferably, the limiting member comprises a Z-direction limiting member and/or an X-direction limiting member for limiting a movement of the unlocking input member in a Z direction and/or an X direction.

By means of the above-mentioned structural arrangement, the movement of the unlocking input member in the Z direction and/or X direction is limited by the limiting member to ensure that the unlocking input member moves in a specific direction driven by the unlocking driving portion, so as to improve the reliability of the unlocking mechanism transmitting displacement to the locking mechanism.

Preferably, the Z-direction limiting member comprises at least one limiting pole, the limiting pole extends and bulges along a side surface in the X direction and is used to insert into a first limiting slot on the support, and/or the X-direction limiting member comprises at least one limiting block, the limiting block extends and bulges upward along the Z direction and is used to insert into a second limiting slot on the support.

By means of the above-mentioned structural arrangement, the purpose of limiting the freedom of movement of the unlocking input member in a specific direction is realized by means of inserting the limiting pole into the corresponding limiting groove located on the support, and the structure is simple and easy to maintain. At the same time, by taking the limiting pole out of the corresponding limiting groove, the limit of the limiting pole on the freedom of movement of the unlocking input member in a specific direction can be conveniently and quickly lifted.

Preferably, the unlocking input member is further provided with a matching member for an unlocking driving portion to drive the unlocking input member to move axially along the Y direction.

Preferably, the matching member is a pin shaft extending and bulging along the X direction.

Preferably, two ends of the unlocking output member are respectively movably connected with the locking mechanism and the unlocking input member, the unlocking input member moves horizontally along the Y direction driven by the unlocking driving portion, and drives the locking mechanism to rotate by means of the unlocking output member to unlock or lock the battery pack, so as to convert the horizontal movement of the unlocking driving portion along the Y direction into a force driving the locking mechanism to unlock or lock the battery pack.

Preferably, the unlocking output member comprises at least one connecting rod, the unlocking input member comprises a pushing rod, and two ends of the connecting rod are respectively movably connected with the pushing rod and the locking mechanism.

By means of the above-mentioned structural arrangement, the displacement on the pushing rod of the unlocking input member is transmitted by the connecting rod of the unlocking output member, so that the horizontal movement of the pushing rod along the Y direction is converted into the rotation movement of the locking mechanism around the X direction by means of the connecting rod structure, which can improve the reliability of the unlocking mechanism to unlock the battery pack.

Preferably, the locking mechanism comprises a connecting portion and a locking portion, one end of the connecting portion is movably connected with the unlocking output member, and the other end of the connecting portion is fixedly connected with the locking portion, so as to transmit the displacement output by the unlocking output member to the locking portion, and unlock or lock the battery pack by means of the locking portion.

Preferably, the locking portion comprises a locking tongue that can be turned over relative to the battery pack and a locking rod that drives the locking tongue to turn over, the locking rod is fixedly connected with the connecting portion, the unlocking input member moves horizontally along the Y direction driven by the unlocking driving portion, and drives the locking rod to rotate by means of the unlocking output member, thereby driving the locking tongue to turn over to unlock or lock the battery pack.

By means of the above-mentioned structural arrangement, the locking portion converts the displacement of the unlocking output member into the rotation of the locking rod, so as to achieve the purpose of driving the locking tongue connected with the locking rod to turn over, and the purpose of unlocking or locking the battery pack is achieved by means of the locking tongue that can turn over relative to the battery pack.

Preferably, the connecting portion comprises a bending member with at least one included angle.

By means of the above-mentioned structural arrangement, the displacement of the unlocking output member is converted into the rotation of the locking rod along the X direction by means of the bending member with the included angle, so as to unlock or lock the battery pack.

Preferably, the unlocking mechanism further comprises a transmission unit, the transmission unit is respectively connected with the unlocking input member and the unlocking output member, the unlocking driving portion drives the unlocking input member to rotate axially along the Y direction, and the transmission unit is used to drive the locking mechanism to rotate axially along the X direction by means of the unlocking output member when the unlocking driving portion drives the unlocking input member to rotate axially along the Y direction, so as to convert the movement of the unlocking driving portion rotating axially along the Y direction into the force that drives the locking mechanism to unlock or lock the battery pack.

Preferably, the transmission unit comprises a rotating member and a sliding member that are matched with each other, the rotating member is driven by the unlocking driving portion to rotate, the sliding member is arranged on the rotating member, and moves along a rotating axis when the rotating member rotates, and the unlocking output member is fixedly connected with the sliding member, so that the transmission unit can convert the rotating movement of the unlocking driving portion into a linear movement to drive the unlocking output member to move along a linear direction.

Preferably, the rotating member comprises a screw rod, the sliding member comprises a nut, the screw rod is connected to the unlocking input member, and the nut is connected to the unlocking output member.

By means of the above-mentioned structural arrangement, the transmission unit can convert the rotating movement into linear movement using the cooperation of the screw rod and the nut, so as to realize the purpose of transmitting the displacement of the unlocking input member to the unlocking output member.

At the same time, the nut has a self-locking function relative to the screw rod, so the nut will not move due to other external forces when the screw rod does not rotate.

Preferably, the two ends of the unlocking output member are respectively movably connected with the sliding member and the locking mechanism, so as to transmit the displacement of the sliding member to the locking mechanism and realize the purpose of unlocking or locking the battery pack.

Preferably, the locking mechanism comprises a connecting portion and a locking portion, one end of the connecting portion is fixedly connected to the locking portion, and the other end of the connecting portion is movably connected to the sliding member, so as to transmit the displacement output by the sliding member to the locking portion, and unlock or lock the battery pack by means of the locking portion.

Preferably, the locking mechanism comprises at least one set of connecting portions and locking portions, and a plurality of connecting portions are connected by means of a linkage mechanism, the linkage mechanism comprises a first connecting rod and a second connecting rod which are vertically connected with each other, the plurality of the connecting portions are movably connected with the first connecting rod, and two ends of the second connecting rod are movably connected with the first connecting rod and the sliding member respectively, so as to transmit the displacement of the sliding member to the plurality of connecting portions and locking portions of the locking mechanism by means of the linkage mechanism.

Preferably, the unlocking mechanism further comprises an unlocking member, the unlocking member is arranged at an end of the unlocking input member, and the unlocking member is used to connect the unlocking input member and the unlocking driving portion.

Preferably, the unlocking member is an unlocking sleeve, and the inner wall of the unlocking sleeve matches the outer wall of a power output portion of the unlocking driving portion.

By arranging the unlocking sleeve, the reliability and success rate of docking between the unlocking driving portion and the unlocking input member are improved, so that the successful docking can also be achieved by means of the unlocking sleeve even when the position error of the unlocking driving portion relative to the unlocking input member is small.

A support assembly, comprising a support and the unlocking mechanism as described above.

The support assembly is driven to move by means of the unlocking input member of the unlocking mechanism to dock from the external unlocking driving portion, so as to transmit the movement to the locking mechanism by means of the unlocking output member and drive the locking mechanism to move to achieve the purpose of unlocking or locking the battery pack. By means of the above-mentioned structural arrangement, a preferred implementation structure for driving the locking mechanism to unlock or lock relative to the battery pack is provided, so as to realize the purpose of automatic unlocking or locking, and improve the reliability of the support assembly in the unlocking or locking process during the process of battery swapping.

Preferably, the support assembly further comprises a locking mechanism, the locking mechanism is arranged on the surface of an end plate of the support to lock a back plate of the battery pack, thereby improving the reliability of position locking between the battery pack and the support.

Preferably, the support assembly further comprises an electrical connection socket, the electrical connection socket is fixed on the surface of the end plate of the support, so as to synchronously complete the process of electrical connection between the battery pack and the support assembly in the process of moving the battery pack into the support along the Y direction.

Preferably, the battery pack enters and exits the support from an entrance and exit of the support along a horizontal direction, and the unlocking input member is arranged below the entrance and exit of the support, so as to realize the connection between the unlocking input member and the unlocking driving portion when the unlocking driving portion moves towards the entrance and exit of the support.

By means of the above-mentioned structural arrangement, the unlocking driving portion may be arranged on the battery swapping device, so as to synchronously realize the connection between the unlocking input member and the unlocking driving portion when the battery swapping device removes and installs the battery pack relative to the support assembly.

Preferably, a bottom plate of the support comprises a profile extending along the moving-in direction of the battery pack, and the unlocking input member is arranged in the profile, so that the profile on the bottom plate can be used to achieve the purpose of accommodating the main components of the unlocking mechanism, protect the unlocking input member from being damaged by external collision, and improve the unlocking reliability of the support assembly.

A battery pack unlocking method, which adopts the unlocking mechanism described above, and the unlocking method comprises the following steps:
controlling the unlocking driving portion to dock with the unlocking input member of the unlocking mechanism;
controlling the unlocking driving portion to drive the unlocking input member to move and drive a locking mechanism to unlock.

By means of the unlocking method, only one unlocking driving portion needs to be correspondingly arranged for a plurality of supports, so that when the support needs to unlock the battery pack, the unlocking driving portion can be docked with the unlocking input member, so that the number of driving portions is effectively reduced, and the support does not need to be provided with driving portions for unlocking the battery pack, thereby simplifying the structural complexity of the support and the electric vehicle using the support and improving the reliability.

Preferably, in the step of controlling the unlocking driving portion to drive the unlocking input member to move and drive the locking mechanism to unlock, the battery pack unlocking method specifically comprises: controlling the unlocking driving portion to apply a Y-direction thrust on the unlocking input member to unlock the locking mechanism.

By means of the above-mentioned structural arrangement, the unlocking driving portion can input the Y-direction thrust to the unlocking input member, so as to achieve the purpose of unlocking the battery pack.

Preferably, in the step of controlling the unlocking driving portion to drive the unlocking input member to move and drive the locking mechanism to unlock, the battery pack unlocking method further comprises: controlling the unlocking driving portion to apply a rotating force on the unlocking input member and drive the unlocking output member to move along a Y direction to unlock the locking mechanism.

By means of the above-mentioned structural arrangement, the unlocking driving portion can input the Y-direction rotation force to the unlocking input member, so as to achieve the purpose of unlocking the battery pack.

A battery pack locking method, which adopts the unlocking mechanism described above, and the locking method comprises the following steps:
controlling the unlocking driving portion to dock with the unlocking input member of the unlocking mechanism;
controlling the unlocking driving portion to drive the unlocking input member to move in the direction opposite to the unlocking direction of the unlocking mechanism, and driving the locking mechanism to lock.

With the locking method, for a plurality of supports, only one unlocking driving portion is needed to complete the locking task. Specifically, when a support needs to lock the battery pack, it is only required to dock the unlocking driving portion to the unlocking input member, so that the number of driving portions is effectively reduced, and the support does not need to be provided with driving portions for locking the battery pack, thereby simplifying the structural complexity of the support and the electric vehicle using the support and improving the reliability.

The positive improved effects of the present disclosure are:

According to the unlocking mechanism, the support assembly, the battery pack unlocking method, and the battery pack locking method, the unlocking input member is connected to the external unlocking driving portion to be driven to move, and the movement is transmitted to the locking mechanism by means of the unlocking output member, so as to drive the locking mechanism to move to achieve the purpose of unlocking or locking the battery pack. By means of the above-mentioned structural arrangement, a preferred implementation structure for driving the locking mechanism to unlock or lock relative to the battery pack is provided, so as to realize the purpose of automatic unlocking or locking, and improve the reliability of the support assembly in the unlocking or locking process during the process of battery swapping.

Figure 1:
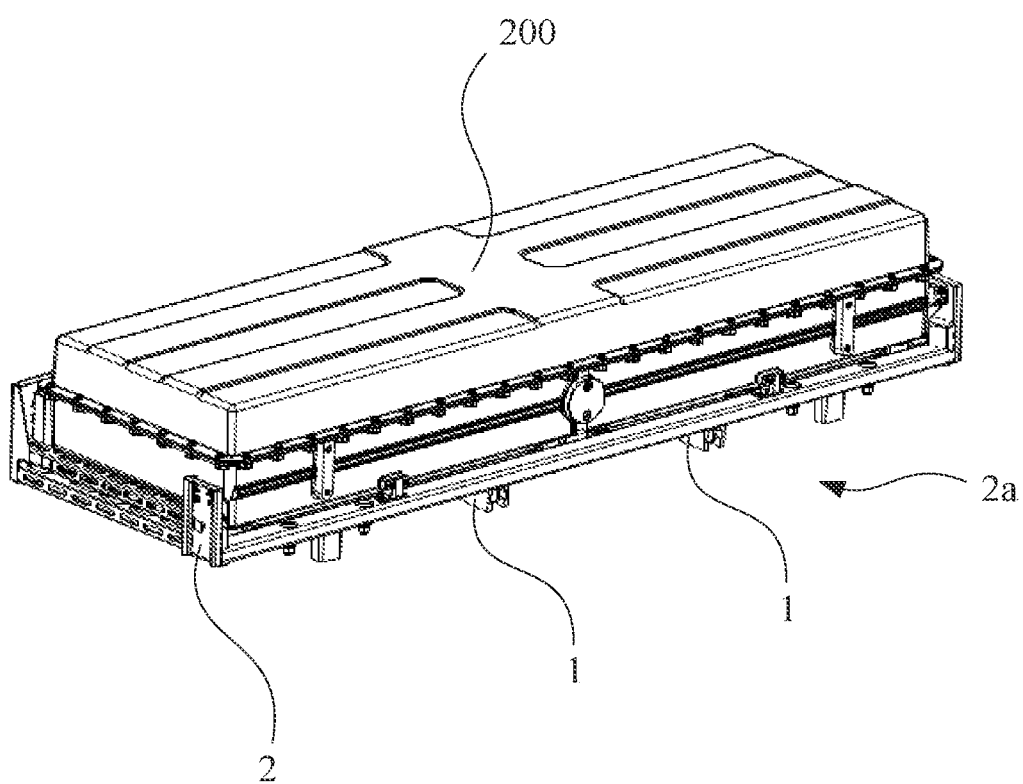
FIG. 1 is a schematic view of the combined relationship between a support assembly and a battery pack in embodiment 1 of the present disclosure.

DESCRIPTION OF REFERENCE NUMERALS support assembly 10
unlocking mechanism 1
unlocking input member 11
limiting member 111
limiting groove 112
positioning hole 113
unlocking output member 12
first connecting rod 12*b*
second connecting rod 12*c*
transmission unit 13
rotating member 131
sliding member 132
unlocking sleeve 14
support 2
bottom plate 21, profile 211
end plate 22
locking mechanism 3
bending member 311
locking tongue 321
locking rod 322
battery pack 200

DETAILED DESCRIPTION OF THE PREFERRED EMBODIMENT

The present disclosure is further described by means of the following embodiments, but the present disclosure is not limited by the following embodiments thereto.

Embodiment 1

Figure 2:
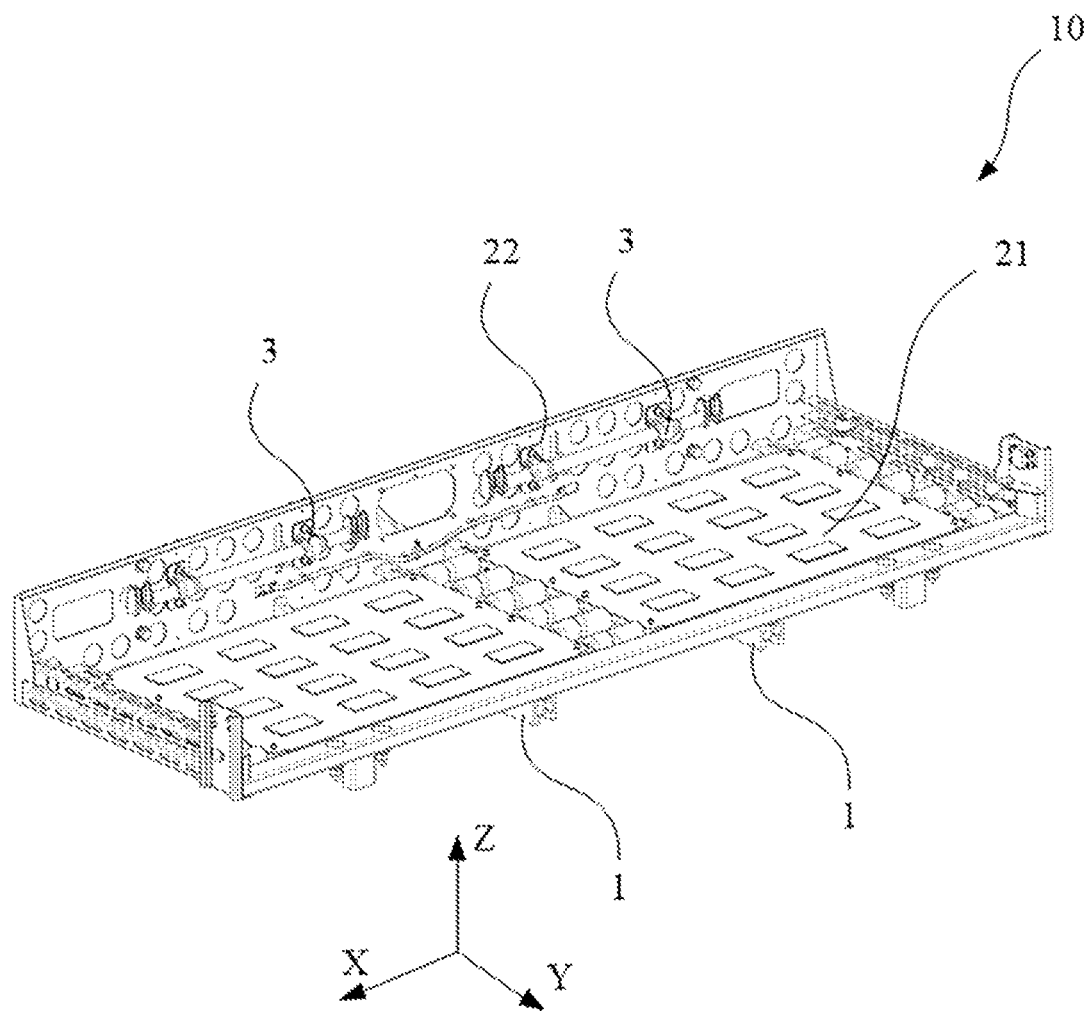
FIG. 2 is a schematic view (1) of the structure of the support assembly in embodiment 1 of the present disclosure.

As shown in FIG. 1 and FIG. 2, the present disclosure provides a support assembly 10 for mounting on an electric vehicle. The support assembly 10 comprises a support 2, an unlocking mechanism 1 and a locking mechanism 3. Herein, the support 2 has an entrance and exit 2*a* for a battery pack 200 to enter and exit the support 2 in a horizontal direction (i.e. the Y direction marked in FIG. 1) by means of the entrance and exit 2*a* of the support 2. Two sets of locking mechanisms 3 are arranged on an end plate 22 of the support 2, and are respectively located on the left and right sides of the end plate 22, to lock an back plate of the battery pack 200 after the battery pack 200 moves into the support 2, so as to fix the battery pack 200 on the support 2, and achieve the purpose of installing the battery pack 200 on the electric vehicle. The unlocking mechanism 1 is set corresponding to the locking mechanism 3 and used to connected to the locking mechanism 3. The function of the unlocking mechanism 1 is to unlock the battery pack 200 locked on the support 2 of the support assembly 10, so that the battery pack 200 can be detached from the support 2, so as to achieve the purpose that the battery pack 200 is removable relative to the electric vehicle. In this embodiment, two sets of unlocking mechanisms and locking mechanisms are set respectively, and in other embodiments, one or more sets of unlocking mechanisms and locking mechanisms are set according to the length of the battery pack.

Figure 3:
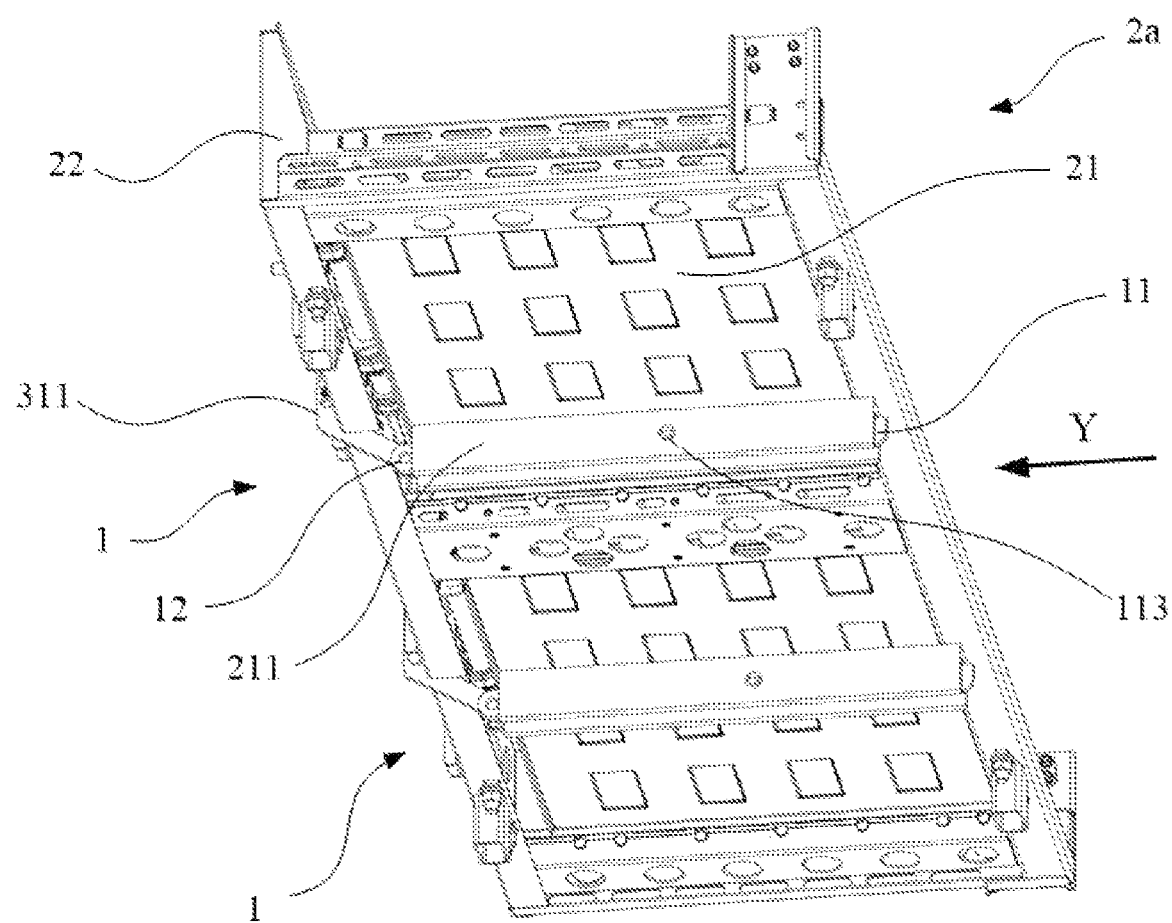
FIG. 3 is a schematic view (2) of the structure of the support assembly in embodiment 1 of the present disclosure.

As shown in FIG. 3, the unlocking mechanism 1 is arranged at the lower surface of a bottom plate 21 of the support 2, and extends from one side of the end plate 22 of the support 2 to the side of the entrance and exit 2*a* of the support2 along the Y direction. The unlocking mechanism 1 comprises an unlocking input member 11 and an unlocking output member 12. The unlocking input member 11 is adapted to be connected to an external unlocking driving portion (not shown in the figures), and is driven by the external unlocking driving portion to drive the unlocking output member 12 to move, while the unlocking output member 12 is adapted to be connected to the locking mechanism 3 and drive the locking mechanism 3 to move to unlock or lock the battery pack 200.

The unlocking mechanism 1 is driven to move by setting the unlocking input member 11 to dock from the external unlocking driving portion, and transmit the movement to the locking mechanism 3 by means of the unlocking output member 12, so as to drive the locking mechanism 3 to move to achieve the purpose of unlocking or locking the battery pack 200. By means of the above-mentioned structural arrangement, a preferred implementation structure for driving the locking mechanism 3 to unlock or lock relative to the battery pack 200 is provided, so as to realize the purpose of automatic unlocking or locking, and improve the reliability of the unlocking or locking process in the process of battery swapping.

Herein, the unlocking input member 11 is arranged on the lower surface of the bottom plate 21 of the support 2, so as to facilitate docking with the external unlocking driving portion. The unlocking input member 11 is located below the entrance and exit 2*a* of the support 2, so as to realize the purpose of docking with the unlocking driving portion when the unlocking driving portion approaches the entrance and exit 2*a* of the support 2.

Specifically, the unlocking driving portion may be installed on the battery tray of the battery swapping device. The battery swapping device is used to remove and install and replace the battery pack located on the electric vehicle. When the battery swapping device remove and install the battery pack 200 with respect to the support assembly 10, the battery tray of the battery swapping device may inevitably move horizontally and approach the entrance and exit 2*a* of the support 2. Therefore, the unlocking driving portion is installed on the battery tray, and the purpose of the unlocking driving portion docking to the unlocking input member 11 can be realized synchronously by using the movement of the battery tray towards the direction close to the support 2.

Figure 4:
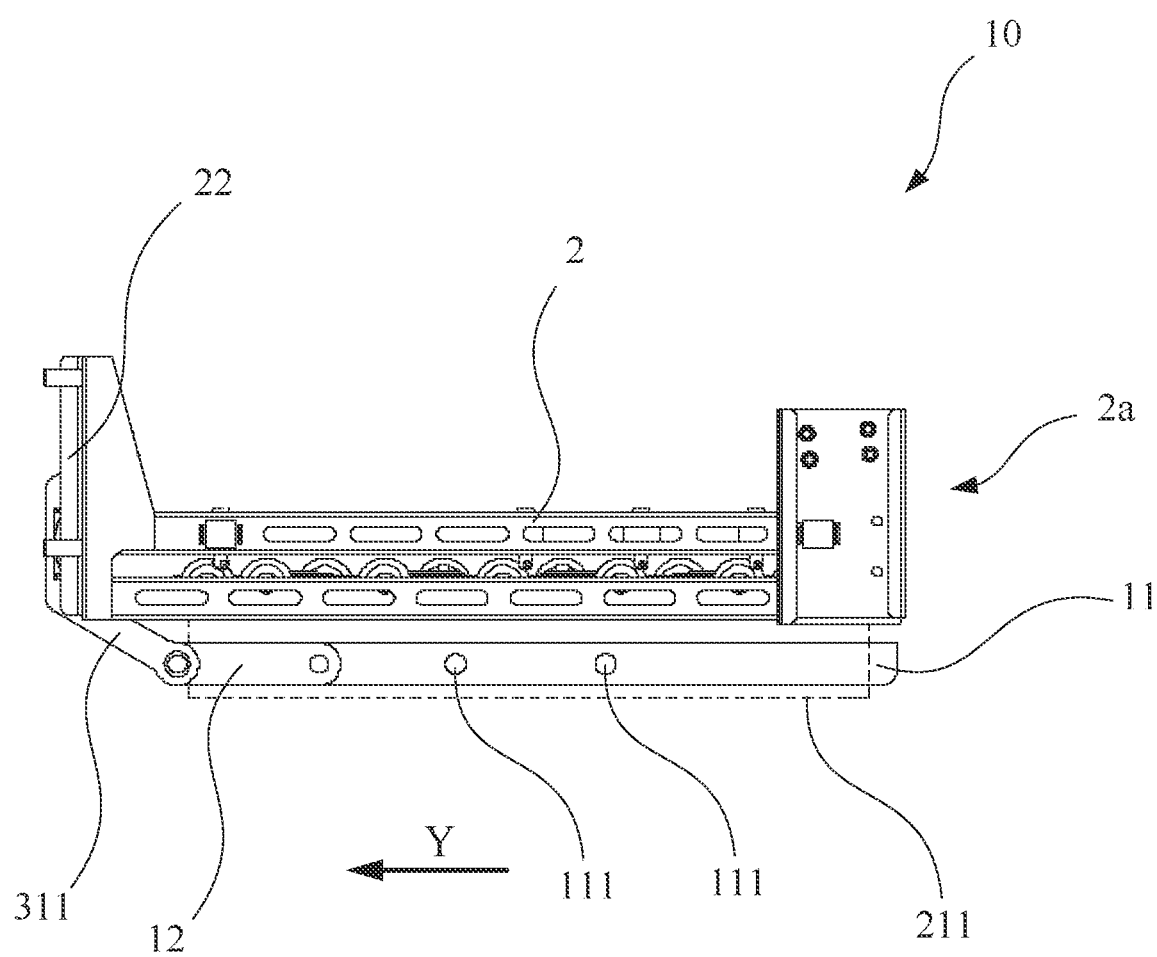
FIG. 4 is a schematic view (1) of the state of an unlocking mechanism in embodiment 1 of the present disclosure.

As shown in FIG. 3 and FIG. 4, a profile 211 extending along the moving-in direction (i.e. Y direction) of the battery pack 200 is provided on the bottom surface of the bottom plate 21 of the support 2. The unlocking input member 11 and the unlocking output member 12 are both arranged in the profile 211, so that the profile 211 on the bottom plate 21 is used to achieve the purpose of accommodating the main components of the unlocking mechanism 1, protect the unlocking input member 11 and other components from being damaged by external collision, so as to improve the unlocking reliability of the support assembly 10. At the same time, the profile 211 can also be used to position the unlocking input member 11, so that the unlocking input member 11 in this embodiment can move along the Y direction driven by the unlocking driving portion, while maintaining the positioning along the X direction and the Z direction without shaking.

Figure 5:
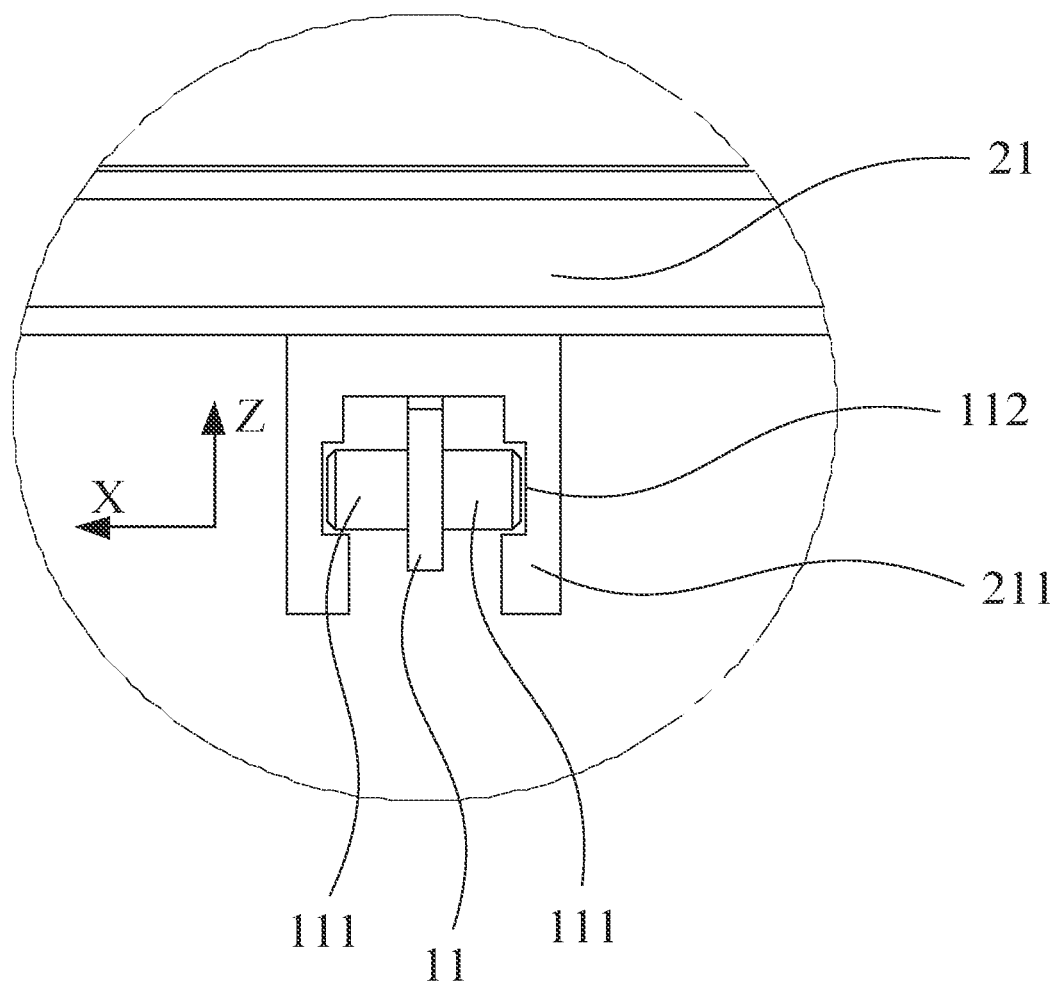
FIG. 5 is a schematic front view of the structure of the unlocking mechanism in embodiment 1 of the present disclosure.

Specifically, this embodiment provides a scheme that the profile 211 on the bottom plate 21 positions the unlocking input member 11 to move horizontally relative to the support 2 in the Y direction. As shown in FIG. 4 and FIG. 5, the unlocking input member 11 is provided with a limiting member 111, the limiting member 111 is specifically two limiting poles to extend and bulge in the X direction relative to the side surface of the unlocking input member 11, and the profile 211 is provided with limiting grooves 112 extending in the Y direction. The two limiting members 111 slide in the limiting grooves 112 respectively, so that the whole unlocking input member 11 can only move in the Y direction relative to the support 2, so as to accurately transmit the movement of the unlocking driving portion to the locking mechanism 3, and realize the purpose of accurately and reliably unlocking or locking the battery pack 200.

At the same time, when it is required to take the unlocking input member 11 out of the profile 211, the limiting member 111 can be moved out of the limiting groove112 only by moving in the Y direction.

It is certain that in other embodiments, the limiting member 111 may also extend in the Z direction or other directions and be positioned in the limiting groove 112 on the profile 211, which can also realize the purpose of restricting the movement of the unlocking input member 11 in the Z direction or the X direction. In addition, the limiting member 111 may not be a cylindrical structure, but a block-like limiting block and other structures, so as to realize the purpose of restricting the unlocking input member 11 from moving in a specific direction by means of sliding in the limiting groove 112 of the profile 211.

As shown in FIG. 4, in this embodiment, the unlocking output member 12 comprises a connecting rod which is a straight rod, and both ends of the connecting rod are provided with hinged ends, one end is hinged with the locking mechanism 3, and the other end is hinged with the pushing rod of the unlocking input member 11 (the pushing rod in this embodiment is the body of the unlocking input member 11), and both limiting members 111 are arranged on the pushing rod. When the pushing rod of the unlocking input member 11 moves horizontally in the Y direction driven by the unlocking driving portion, the horizontal displacement is converted into a rotational displacement that drives the locking mechanism 3 to rotate axially around the X direction to unlock or lock the battery pack 200 by means of a linkage mechanism formed by the connecting rod of the unlocking output member 12, so as to use the unlocking mechanism 1 to convert the horizontal movement of the unlocking driving portion in the Y direction into a force that drives the locking mechanism 3 to unlock or lock the battery pack 200.

It should be noted that in this embodiment, the unlocking input member 11 and unlocking output member 12 are two different components connected with each other. However, in other embodiments, the unlocking input member 11 and unlocking output member 12 may also be a single member integrally formed.

Figure 6:
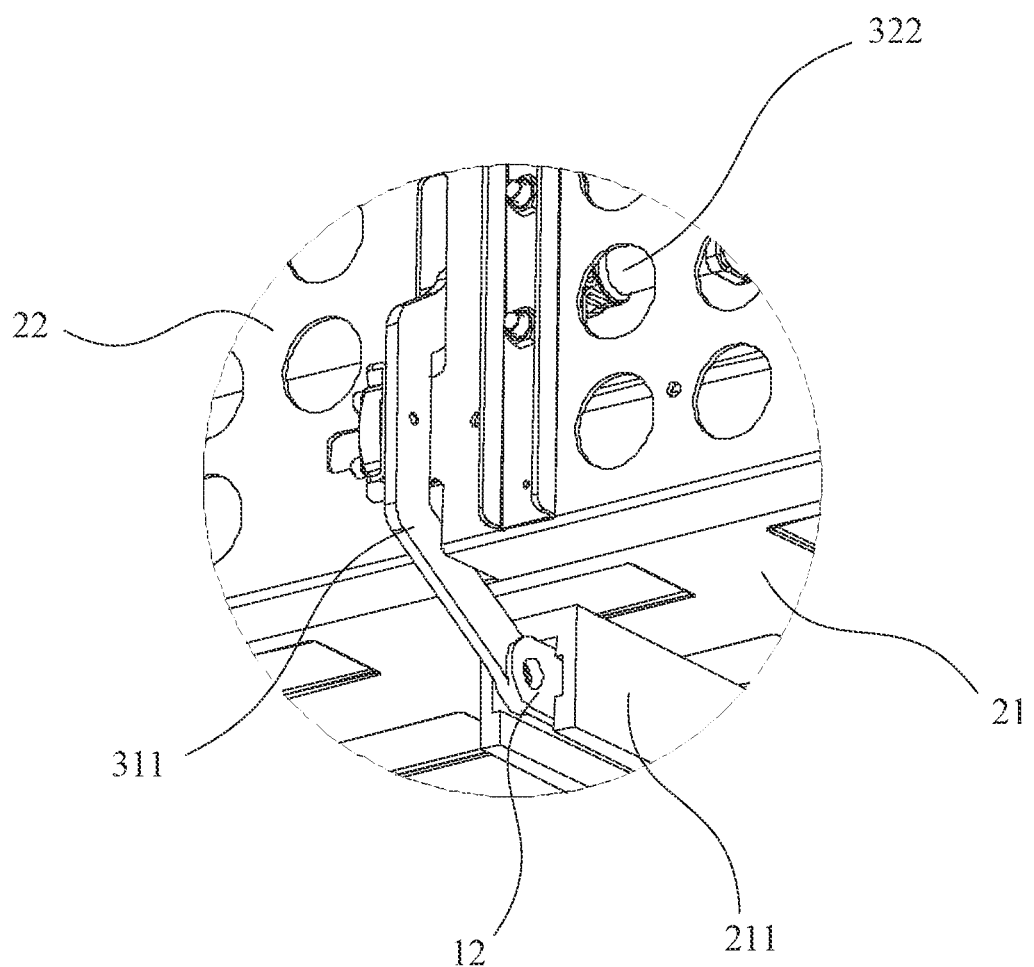
FIG. 6 is a schematic view (1) of a partial structure of an end plate side of the support assembly in embodiment 1 of the present disclosure.
Figure 7:
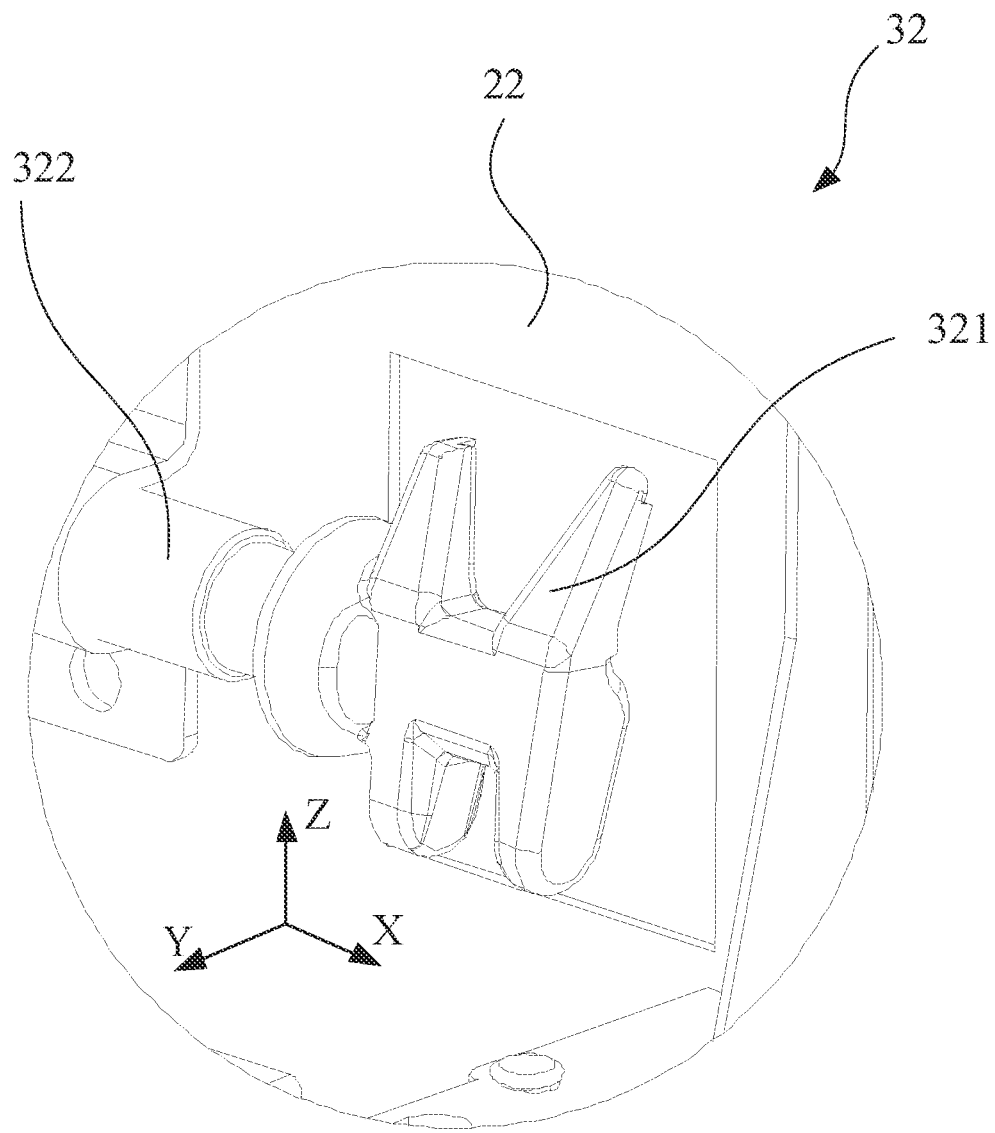
FIG. 7 is a schematic view (2) of a partial structure of the end plate side of the support assembly in embodiment 1 of the present disclosure.

Specifically, the structure of the locking mechanism 3 in this embodiment is shown in FIG. 6 and FIG. 7. The locking mechanism 3 comprises a connecting portion and a locking portion. The specific form of the connecting portion is a bending member 311 with an included angle, one end of which is directly connected with the connecting rod of the unlocking output member 12 to transmit the movement of the unlocking output member 12 to the locking portion. The locking portion comprises a locking tongue 321 that can be turned over relative to the battery pack 200 and a locking rod 322 that drives the locking tongue 321 to turn over. Herein, the locking rod 322 is fixedly connected with the bending member 311, the unlocking input member 11 moves horizontally in the Y direction driven by the unlocking driving portion, and the unlocking output member 12 drives the bending member 311 and the locking rod 322 to rotate in the X direction, and then drives the lock tongue 321 to turn over to unlock or lock the battery pack 200.

By means of the above-mentioned structural arrangement, the locking portion converts the displacement of the unlocking output member 12 into the rotation of the locking rod 322 along the X direction, so as to achieve the purpose of driving the locking tongue 321 connected with the locking rod 322 to turn over, and the purpose of unlocking or locking the battery pack 200 is achieved by means of the locking tongue 321 that can turn over relative to the battery pack 200.

Figure 8:
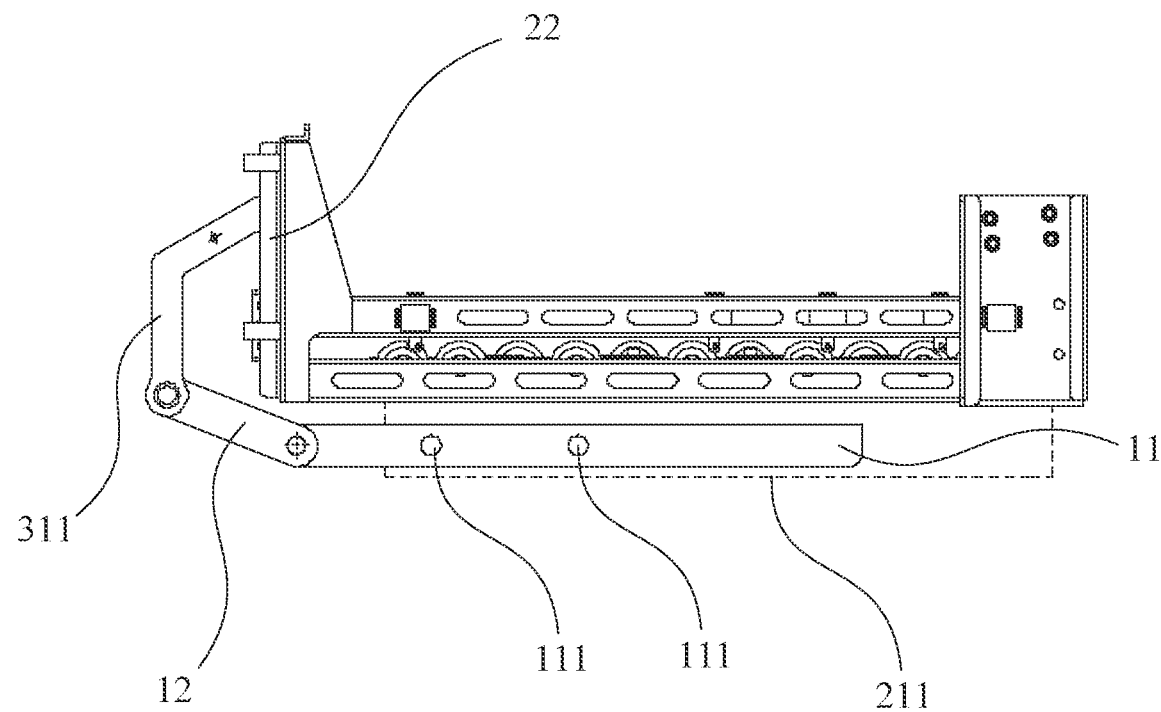
FIG. 8 is a schematic view (2) of the state of the unlocking mechanism in embodiment 1 of the present disclosure.

Herein, the movement state of the connecting rod of the unlocking output member 12 is shown in FIG. 4 and FIG. 8. When the unlocking driving portion drives the pushing rod to move towards the side of the end plate 22 of the support 2 in the Y direction, the connecting rod converts the Y-direction displacement into the X-direction rotation of the connecting rod by means of rotation of the connecting rod, so as to drive the locking rod 322 of the locking mechanism 3 in FIG. 7 to rotate, thus enabling the locking tongue 321 of the locking mechanism 3 to turn over, so as to realize the purpose of locking or unlocking the battery pack 200. It can be seen from the figures that the connecting rod is a straight rod to transmit the displacement of the side of the bottom plate 21 of the support 2 to the side of the end plate 22 of the support 2.

In addition, as shown in FIG. 3, positioning holes 113 are provided on the side surface of the profile 211 and the side surface of the pushing rod of the unlocking input member 11 for horizontally installing positioning pins (not shown in the figures). When the unlocking input member 11 is located at a specific position relative to the profile 211, the positioning pins can simultaneously penetrate into the positioning holes 113 of the profile 211 and the unlocking input member 11, so as to fix the position of the profile 211 relative to the unlocking input member 11 by pin connection, so as to completely fix the position of the unlocking input member 11 relative to the support 2 after the unlocking input member 11 moves to the above-mentioned specific position, so that the unlocking mechanism 1 can maintain the unlocked or locked state after driving the locking mechanism 3 to unlock or lock the battery pack 200, and the unlocking mechanism 1 may not return to another state because the unlocking driving portion is removed.

Herein, the installation and removal of the positioning pin relative to the pushing rod may be realized by means of a driver arranged on the bottom plate 21 of the support 2. The function of the driver is to drive the positioning pin to move back and forth in the horizontal direction, so as to realize the purpose of the pin connection and fixing position of the unlocking input member 11 relative to the profile 211, and the specific implementation structure of the driver is be described here.

Figure 9:
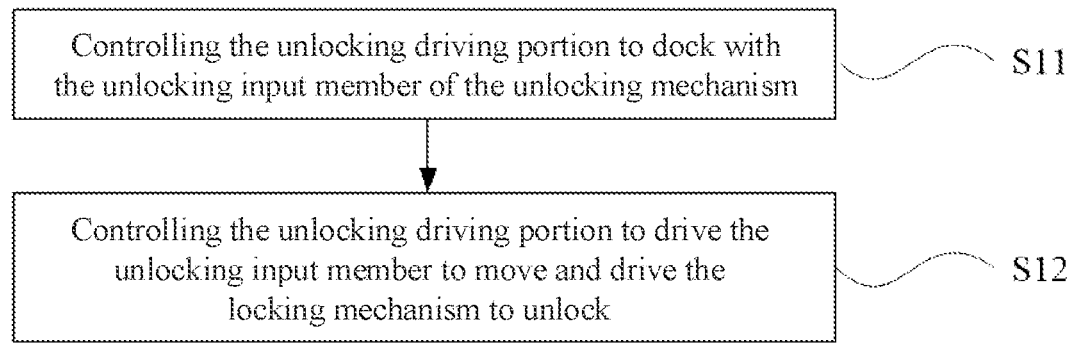
FIG. 9 is a schematic flowchart of a battery pack unlocking method in embodiment 1 of the present disclosure.

As shown in FIG. 9, the present disclosure further provides a battery pack unlocking method, which adopts the unlocking mechanism described above, and the unlocking method comprises the following steps:

S11, controlling the unlocking driving portion to dock with the unlocking input member of the unlocking mechanism;

S12, controlling the unlocking driving portion to drive the unlocking input member to move and drive the locking mechanism to unlock.

When the battery pack 200 on the support assembly 10 needs to be unlocked, the external unlocking driving portion is docked to the unlocking input member 11 of the unlocking mechanism 1 on the support assembly 10, so as to provide a power source for the support assembly 10 to unlock the battery pack 200 and realize the purpose of unlocking the battery pack 200. Under this unlocking method, only one unlocking driving portion needs to be correspondingly arranged for multiple support assemblies 10, so that when a certain support assembly 10 needs to unlock the battery pack 200, it is only required to dock the unlocking driving portion with the unlocking input member 11 on the support assembly 10, which effectively reduces the number of drive components, and there is no need to set additional drive members on the support assembly 10 to unlock the battery pack 200, thus simplifying the support assembly 10 and the structural complexity of the electric vehicle using the support assembly 10, and improving the overall reliability of the device.

The unlocking driving portion may be directly arranged on the battery tray of the battery swapping device as described above, so that when the battery tray is driven by the extension mechanism of the battery swapping device to move towards the support assembly 10, the purpose of the unlocking driving portion approaching the unlocking input member 11 and completing the connection can be synchronously realized.

Figure 10:
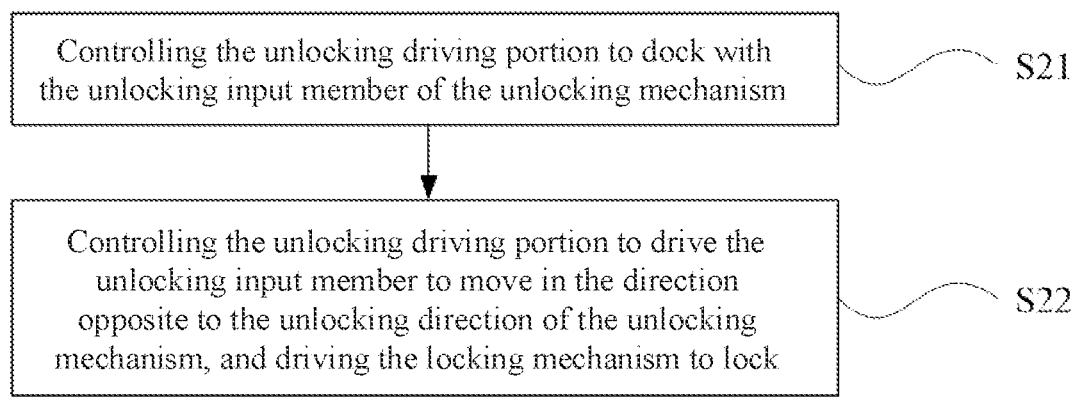
FIG. 10 is a schematic flowchart of a battery pack locking method in embodiment 1 of the present disclosure.

In addition, as shown in FIG. 10, the present disclosure further provides a battery pack locking method, which also adopts the unlocking mechanism 1 described above, and the locking method comprises the following steps:

S21, controlling the unlocking driving portion to dock with the unlocking input member of the unlocking mechanism;

S22, controlling the unlocking driving portion to drive the unlocking input member to move in the direction opposite to the unlocking direction of the unlocking mechanism, and driving the locking mechanism to lock.

In this locking method, the unlocking driving portion located outside the support assembly 10 is used to drive the unlocking input member 11 to move in the direction opposite to the unlocking direction, so that the locking mechanism 3 can lock the battery pack 200.

In this embodiment, the unlocking driving portion may be an air cylinder, so as to realize the purpose of pulling the unlocking input member 11 to move in the Y direction by means of pneumatically driving, so as to lock the battery pack 200. It is certain that the unlocking driving portion may also be any mechanism capable of linear movement in the prior art.

For a plurality of support assemblies 10, only one unlocking driving portion is needed to be arranged correspondingly to complete the locking task. Specifically, when a certain support assembly needs to lock the battery pack 200, it is only required to dock the unlocking driving portion with the unlocking input member 11, which effectively reduces the number of driving portions, and there is no need to set driving portions on the support assembly 10 for locking the battery pack 200, thereby simplifying the structural complexity of the support assembly 10 and the electric vehicle using the support assembly 10, and improving the reliability.

Embodiment 2

Figure 11:
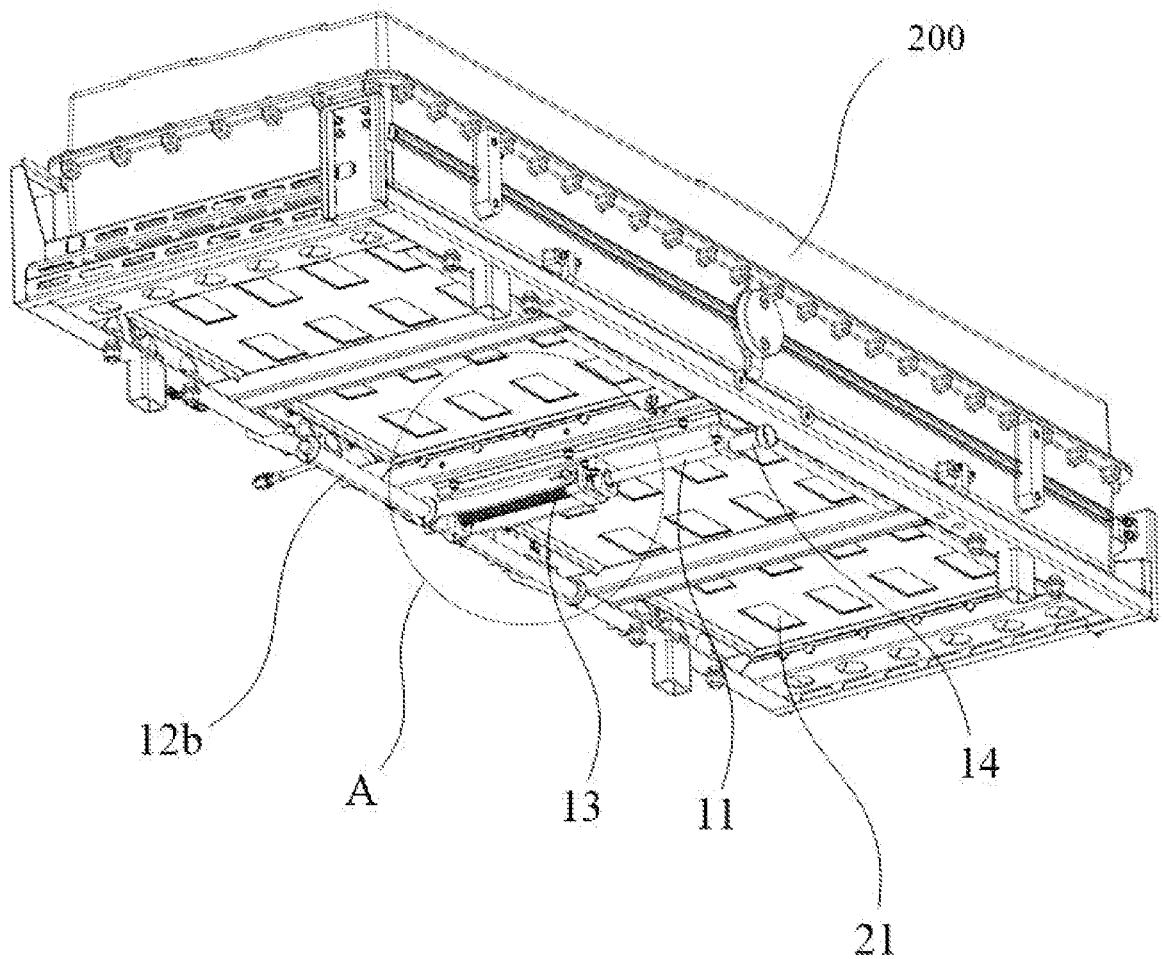
FIG. 11 is a schematic view (1) of the structure of a support assembly in embodiment 2 of the present disclosure.
Figure 12:
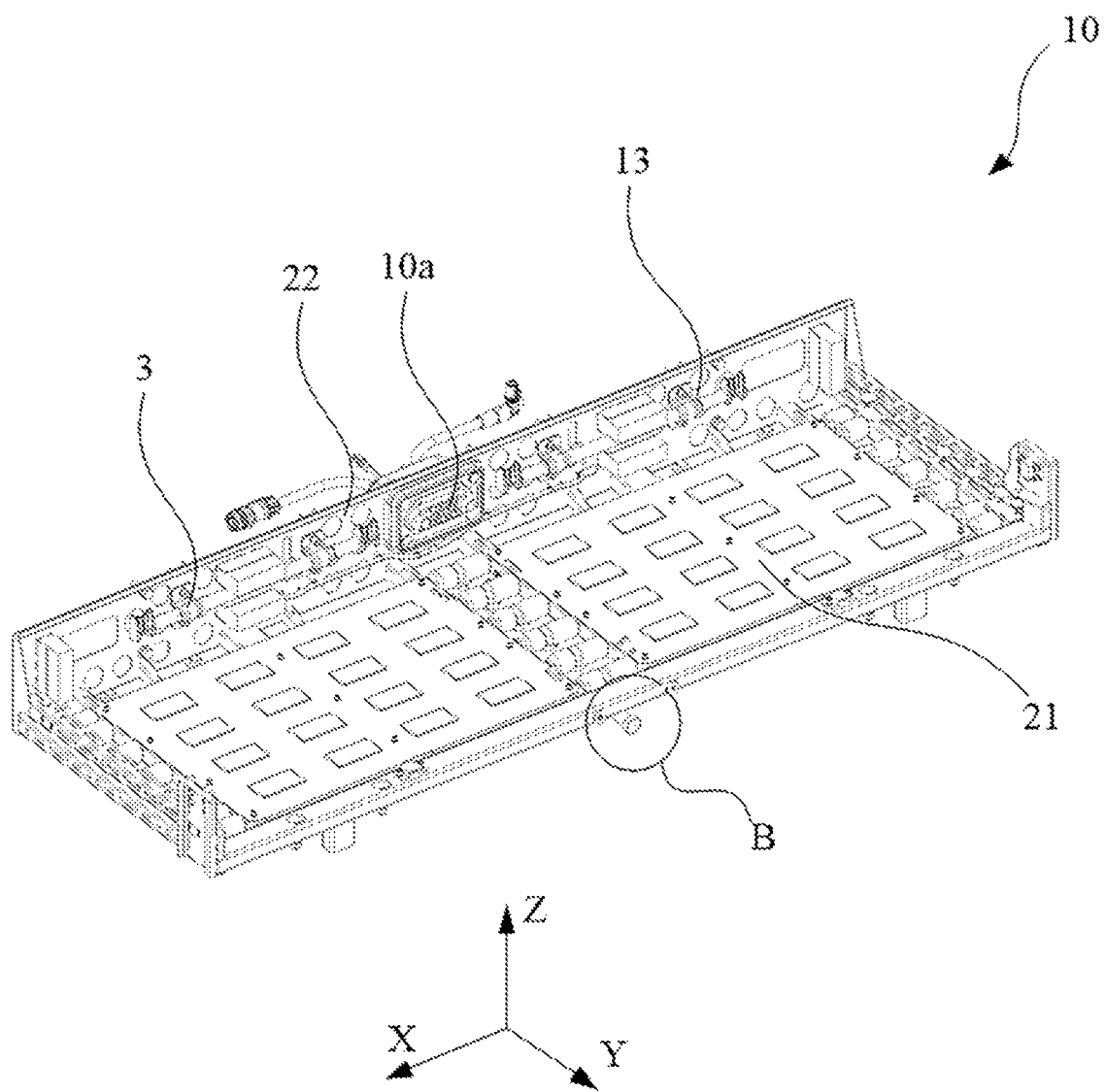
FIG. 12 is a schematic view (2) of the structure of the support assembly in embodiment 2 of the present disclosure.

As shown in FIG. 11 and FIG. 12, this embodiment provides a support assembly 10, the structure of its unlocking mechanism 1 is roughly the same as that of the unlocking mechanism 1 provided in embodiment 1, and the differences are as follows: in this embodiment, the unlocking driving portion arranged outside the support assembly 10 drives the unlocking input member 11 to rotate axially along the Y direction. The unlocking mechanism 1 further comprises a transmission unit 13, the transmission unit 13 is arranged between the unlocking input member 11 and the unlocking output member 12 and is respectively connected to the unlocking input member 11 and the unlocking output member 12, so that the Y-direction axial rotation of the unlocking driving portion input to the unlocking input member 11 can be further transmitted to the unlocking output member 12. The transmission unit 13 can convert the Y-direction axial rotation of the unlocking input member 11 into the Y-direction horizontal movement of the unlocking output member 12, and then convert the horizontal movement mentioned above into a movement that drives the locking mechanism 3 to rotate axially around the X direction by means of the connecting rod of the unlocking output member 12, so that the locking mechanism 3 can unlock or lock the battery pack 200. Specifically, the structure of the locking mechanism 3 in this embodiment is the same as that in embodiment 1, and the details are not repeated here.

Figure 13:
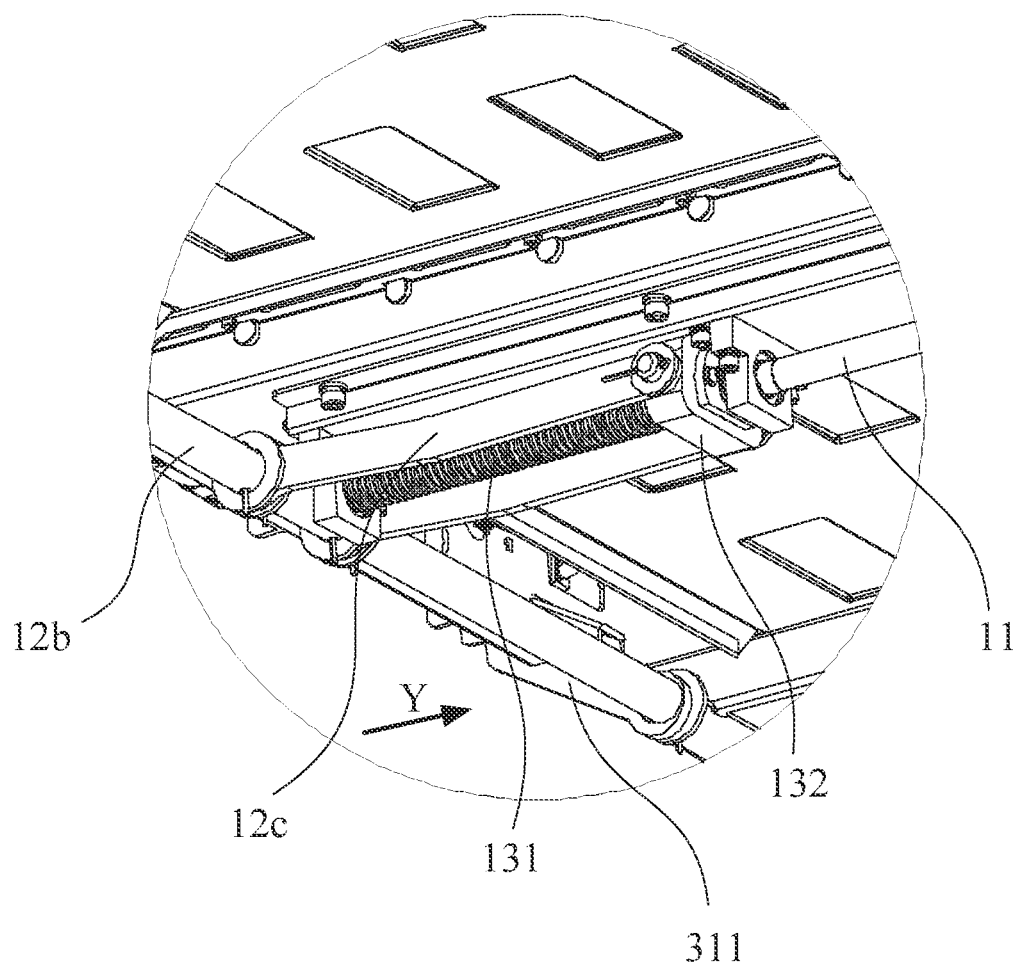
FIG. 13 is a partial enlarged view of part A in FIG. 11.
Figure 14:
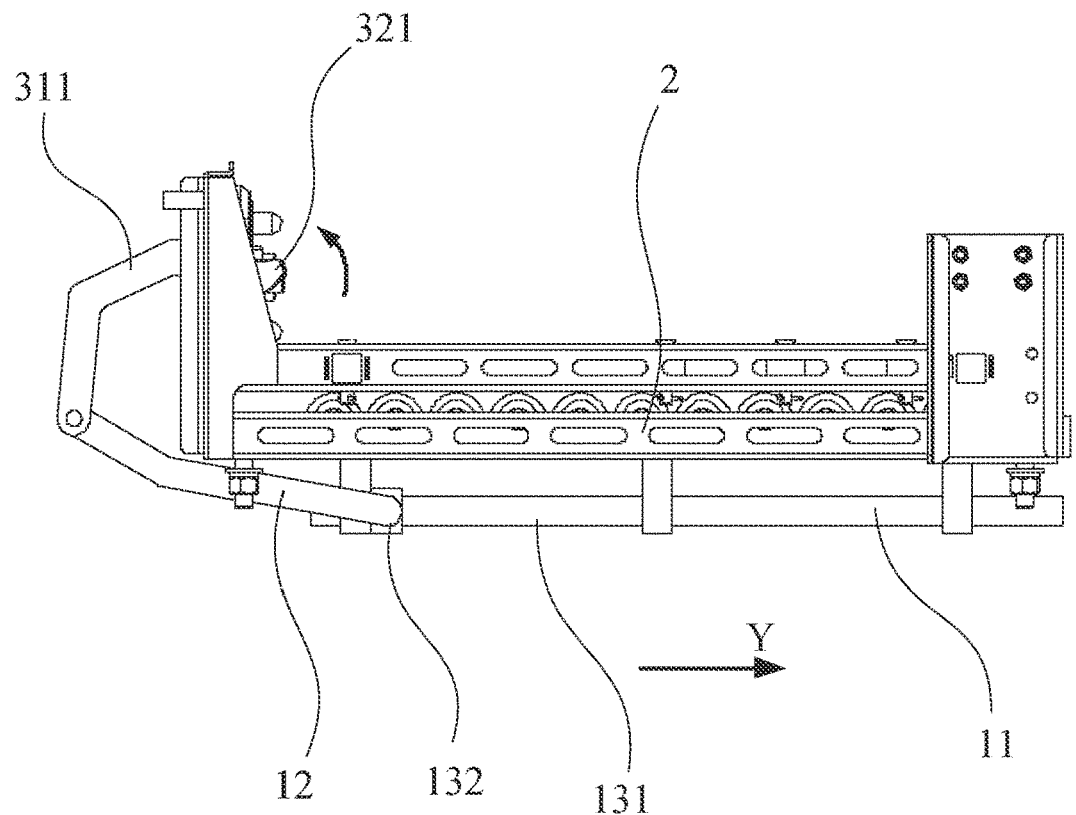
FIG. 14 is a schematic view of the state of an unlocking mechanism in embodiment 2 of the present disclosure.

As shown in FIG. 13 and FIG. 14, the transmission unit 13 specifically comprises a rotating member 131 and a sliding member 132 that cooperate with each other. Herein, the rotating member 131 in this embodiment is specifically a screw rod, which can be connected to the unlocking driving portion by means of the unlocking input member 11 to rotate driven by the unlocking driving portion, while the sliding member 132 is specifically a nut, which is threadedly connected with the screw rod and moves along the Y direction (that is the axial direction of the screw rod) when the screw rod rotates, and the nut is connected with the connecting rod of the unlocking output member 12 to drive the unlocking output member 12 to generate horizontal displacement. The connection and installation mode of the rotating member and the support is as follows:

in the transmission unit 13 in this embodiment, the transmission unit 13 can convert the rotary motion into the linear motion by means of the cooperation of the screw rod and the nut, so as to realize the purpose of transmitting the axial rotation of the unlocking input member 11 to the unlocking output member 12.

Specifically, as shown in FIG. 14, when the unlocking driving portion drives the unlocking input member 11 to rotate in a certain direction, the screw rod can drive the nut to move towards the direction close to the end plate 22, so as to drive the unlocking output member 12 to move, thus realizing the purpose of driving the locking mechanism 3 to unlock the battery pack 200. At the same time, when the unlocking driving portion drives the unlocking input member 11 to rotate in the direction opposite to the above direction, the screw rod can drive the nut to move away from the end plate 22, so as to drive the unlocking output member 12 to move in the opposite direction, thus realizing the purpose of driving the locking mechanism 3 to lock the battery pack 200.

At the same time, the nut has a self-locking function relative to the screw rod, so the nut may not be displaced due to other external forces when the screw rod does not rotate. That is to say, for the unlocking mechanism 1 of this embodiment, there is no need to provide a positioning pin and other structures to lock the state of the unlocking mechanism 1.

In other embodiments, the transmission unit may also adopt a gear, a rack and other mechanisms that may convert axial rotation into horizontal motion.

In addition, as shown in FIG. 12, the number of locking mechanisms 3 in this embodiment is also two sets, each set of locking mechanisms 3 comprises a connecting portion and a locking portion, while the number of unlocking mechanisms 1 is only one set, and the connecting portions of the two sets of locking mechanisms 3 are connected by a linkage mechanism. Please refer to FIG. 13, it can be seen from the figure that the linkage mechanism in this embodiment is formed on the unlocking output member 12, and specifically comprises a first connecting rod 12*b* and a second connecting rod 12*c* which are vertically connected with each other. The connecting portions of the two locking mechanisms 3 (i.e. the bending members 311) are respectively movably connected with the first link 12*b*, and one end of the second connecting rod 12*c* is provided with a through hole for the first connecting rod 12*b* to be sleeved, and the other end is provided with a through hole for the extending end of the sliding member 132 to be sleeved, so that two ends of the second connecting rod 12*c* are respectively made up connection relationships of movable connection with the first connecting rod 12*b* and the sliding member 132, so that the displacement of the sliding member 132 is simultaneously transmitted to two sets of locking mechanisms 3 by means of the linkage mechanism, so that the purpose that one set of unlocking mechanisms 1 drives multiple sets of locking mechanisms 3 to unlock or lock synchronously is achieved, the efficiency of disassembling the battery pack is improved, the structure of unlocking mechanisms installed on the support is simplified, and the number of unlocking driving portions that need to be docked to the support assembly 10 is reduced. In other embodiments, the number of locking mechanisms is adjusted according to the size of the battery pack.

Figure 15:
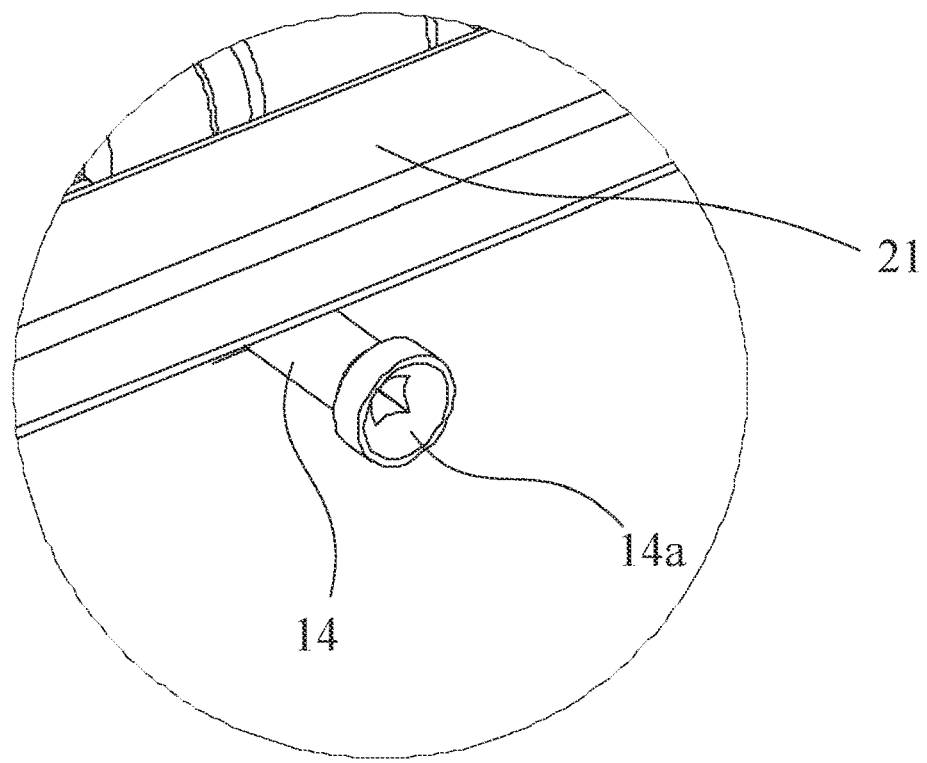
FIG. 15 is a partial enlarged view of part B in FIG. 12.

In addition, as shown in FIG. 15, the unlocking mechanism 1 is also provided with an unlocking sleeve 14, the unlocking sleeve 14 is installed at the end of the unlocking input member 11 for docking with the unlocking driving portion. The end of the unlocking sleeve 14 for docking with the unlocking driving portion is provided with an aslant arranged annular guide inclined surface 14*a*. By means of the inclined surface 14*a* mentioned above, the unlocking driving portion may be guided to accurately dock with the unlocking input member 11, so as to improve the reliability and success rate of docking between the unlocking driving portion and the unlocking input member 11, so that the unlocking sleeve 14 can also realize successful docking when the unlocking driving portion has a small position error relative to the unlocking input member 11. In other embodiments, the docking between the unlocking sleeve 14 and the unlocking driving portion may also be in other connection modes, such as pin connection, clamping connection and the like.

Herein, the unlocking driving portion in this embodiment needs to input rotational motion to the unlocking input member 11, so its specific structure may be a rotating motor, and the unlocking driving member is arranged on the rotating shaft of the rotating motor to dock with the unlocking sleeve 14 and realize the input of rotational displacement. It is certain that the unlocking driving portion may also be any mechanism that can implement the rotary motion in the prior art.

Although the specific embodiments of the present disclosure are described above, it should be understood by those skilled in the art that this is only an example, and the scope of protection of the present disclosure is defined by the appended claims. Those skilled in the art can make various changes or modifications to these embodiments without departing from the principles and essence of the present disclosure, but these changes and modifications fall into the scope of protection of the present disclosure.

What is claimed is:

1. An unlocking mechanism, which is used for unlocking a battery pack locked on a support of an electric vehicle, wherein the support has an entrance and exit for a battery pack to enter and exit the support in a Y direction by means of the entrance and exit, the unlocking mechanism comprises an unlocking input member and an unlocking output member, the unlocking input member is movably connected to and located on the lower surface of a bottom plate of the support, the unlocking input member is adapted to be connected to an external unlocking driving portion, and is driven by the external unlocking driving portion to drive the unlocking output member to move, the unlocking output member is adapted to be connected to a locking mechanism on the support and drive the locking mechanism to move to unlock or lock the battery pack;

two ends of the unlocking output member are respectively movably connected with the locking mechanism and the unlocking input member, the unlocking input member moves horizontally along the Y direction driven by the unlocking driving portion, and drives the locking mechanism to rotate by means of the unlocking output member to unlock or lock the battery pack.

2. The unlocking mechanism as claimed in claim 1, wherein the unlocking input member is provided with a limiting member for limiting a horizontal movement of the unlocking input member relative to the support along the Y direction;

preferably, the limiting member comprises a Z-direction limiting member and/or an X-direction limiting member for limiting a movement of the unlocking input member in a Z direction and/or an X direction;

preferably, the Z-direction limiting member comprises at least one limiting pole, the limiting pole extends and bulges along a side surface in the X direction and is used to insert into a first limiting slot on the support, and/or the X-direction limiting member comprises at least one limiting block, the limiting block extends and bulges upward along the Z direction and is used to insert into a second limiting slot on the support.

3. The unlocking mechanism as claimed in claim 1, wherein the unlocking input member is further provided with a matching member for an unlocking driving portion to drive the unlocking input member to move axially along the Y direction;

preferably, the matching member is a pin shaft extending and bulging along the X direction.

4. The unlocking mechanism as claimed in claim 1, wherein the unlocking output member comprises at least one connecting rod, the unlocking input member comprises a pushing rod, and two ends of the connecting rod are respectively movably connected with the pushing rod and the locking mechanism;
preferably, the locking mechanism comprises a connecting portion and a locking portion, one end of the connecting portion is movably connected with the unlocking output member, and the other end of the connecting portion is fixedly connected with the locking portion.

5. The unlocking mechanism as claimed in claim 4, wherein the locking portion comprises a locking tongue that can be turned over relative to the battery pack and a locking rod that drives the locking tongue to turn over, the locking rod is fixedly connected with the connecting portion, the unlocking input member moves horizontally along the Y direction driven by the unlocking driving portion, and drives the locking rod to rotate by means of the unlocking output member, thereby driving the locking tongue to turn over to unlock or lock the battery pack;
preferably, the connecting portion comprises a bending member with at least one included angle.

6. The unlocking mechanism as claimed in claim 1, wherein the unlocking mechanism further comprises a transmission unit, the transmission unit is respectively connected with the unlocking input member and the unlocking output member, the unlocking driving portion drives the unlocking input member to rotate axially along the Y direction, and the transmission unit is used to drive the locking mechanism to rotate axially along the X direction by means of the unlocking output member when the unlocking driving portion drives the unlocking input member to rotate axially along the Y direction.

7. The unlocking mechanism as claimed in claim 6, wherein the transmission unit comprises a rotating member and a sliding member that are matched with each other, the rotating member is driven by the unlocking driving portion to rotate, the sliding member is arranged on the rotating member, and moves along a rotating axis when the rotating member rotates, and the unlocking output member is fixedly connected with the sliding member;
preferably, the rotating member comprises a screw rod, the sliding member comprises a nut, the screw rod is connected to the unlocking input member, and the nut is connected to the unlocking output member.

8. The unlocking mechanism as claimed in claim 7, wherein the two ends of the unlocking output member are respectively movably connected with the sliding member and the locking mechanism.

9. The unlocking mechanism as claimed in claim 8, wherein the locking mechanism comprises a connecting portion and a locking portion, one end of the connecting portion is fixedly connected to the locking portion, and the other end of the connecting portion is movably connected to the sliding member.

10. The unlocking mechanism as claimed in claim 9, wherein the locking mechanism comprises at least one set of connecting portions and locking portions, and a plurality of connecting portions are connected by means of a linkage mechanism, the linkage mechanism comprises a first connecting rod and a second connecting rod which are vertically connected with each other, the plurality of the connecting portions are movably connected with the first connecting rod, and two ends of the second connecting rod are movably connected with the first connecting rod and the sliding member respectively.

11. The unlocking mechanism as claimed in claim 1, wherein the unlocking mechanism further comprises an unlocking member, the unlocking member is arranged at an end of the unlocking input member, and the unlocking member is used to connect the unlocking input member and the unlocking driving portion.

12. The unlocking mechanism as claimed in claim 11, wherein the unlocking member is an unlocking sleeve, and the inner wall of the unlocking sleeve matches the outer wall of a power output portion of the unlocking driving portion.

13. A support assembly, comprising a support and the unlocking mechanism as claimed in claim 1.

14. The support assembly as claimed in claim 13, wherein the support assembly further comprises a locking mechanism, the locking mechanism is arranged on the surface of an end plate of the support;
preferably, the support assembly further comprises an electrical connection socket, the electrical connection socket is fixed on the surface of the end plate of the support.

15. The support assembly as claimed in claim 13, wherein the battery pack enters and exits the support from an entrance and exit of the support along a horizontal direction, and the unlocking input member is arranged below the entrance and exit of the support;
preferably, a bottom plate of the support comprises a profile extending along the moving-in direction of the battery pack, and the unlocking input member is arranged in the profile.

* * * * *